M. UMSTADTER.

Assignor, by mesne assignments, to THE OLD DOMINION MANUFACTURING CO.

Jacquard Attachment for Embroidering Machines.

No. 9,471. Reissued Nov. 16, 1880.

Witnesses:
John C. Turnbridge
Henry T. Parker

Inventor:
Michael Umstadter
by his attorney
A. v. Briesen

N. PETERS, PHOTO-LITHOGRAPHER, WASHINGTON, D. C

UNITED STATES PATENT OFFICE.

MICHAEL UMSTADTER, OF NORFOLK, VIRGINIA, ASSIGNOR, BY MESNE ASSIGNMENTS, TO THE OLD DOMINION MANUFACTURING COMPANY, OF NEW YORK, N. Y.

JACQUARD ATTACHMENT FOR EMBROIDERING-MACHINES.

SPECIFICATION forming part of Reissued Letters Patent No. 9,471, dated November 16, 1880.

Original No. 214,209, dated April 8, 1879. Application for reissue filed August 7, 1880.

DIVISION B.

*To all whom it may concern:*

Be it known that I, MICHAEL UMSTADTER, of Norfolk, in the county of Norfolk and State of Virginia, have invented a new and useful Improvement in Embroidering-Machines, of which the following is an exact description, reference being had to the accompanying drawings, in which—

Figure 1:
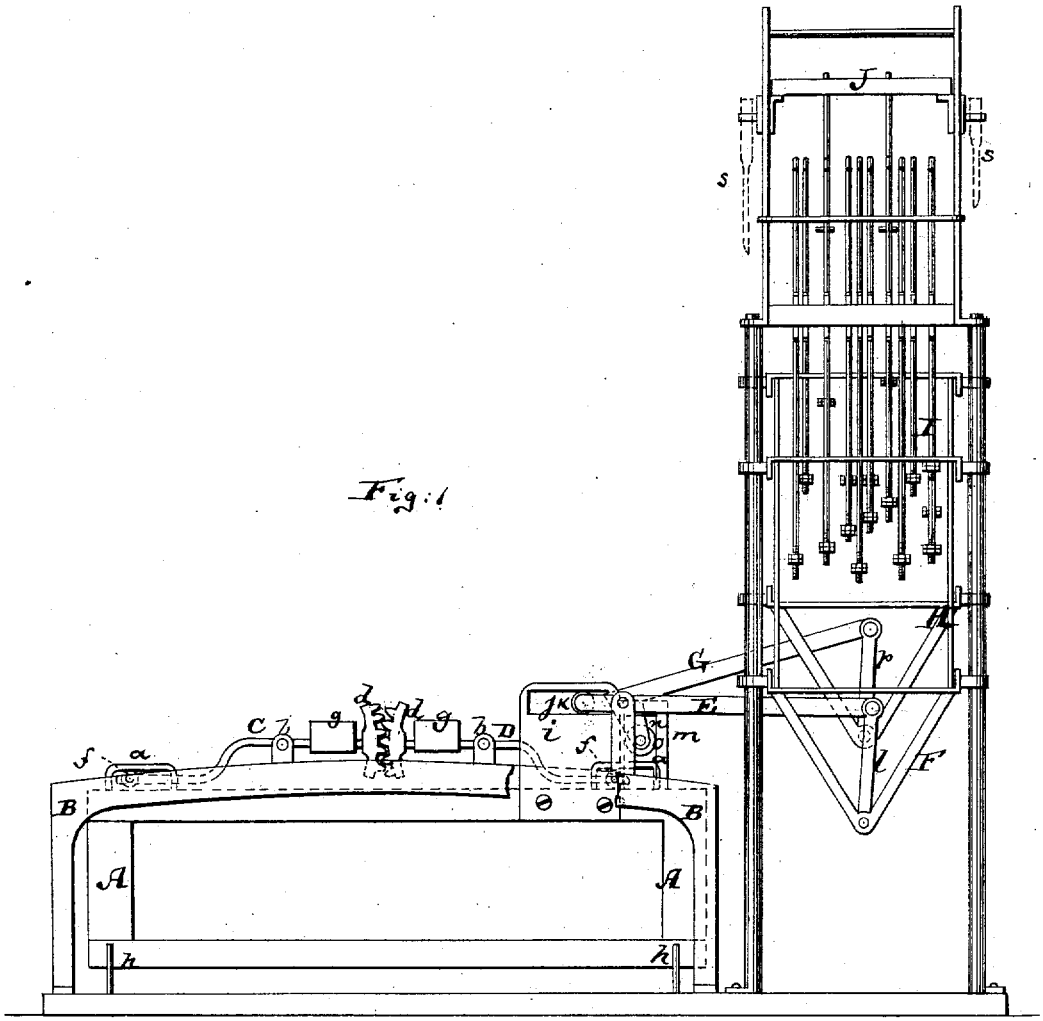
Figure 2:
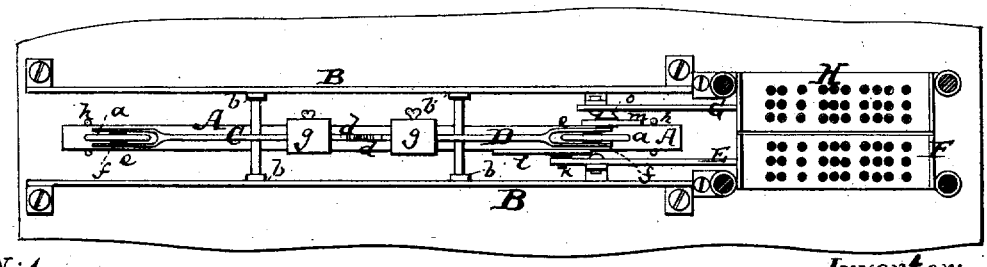

Figure 1 represents a front elevation of my improved embroidering-machine, and Fig. 2 a top view of the same with a portion broken away.

This invention relates to a new arrangement of upright embroidering-frame, which is the frame on which the fabric to be embroidered is stretched. Said frame, according to the present invention, is to receive two distinct motions, one an up-and-down motion, the other a to-and-fro longitudinal motion, so as thereby to bring the fabric which is stretched upon it, or any desired point on said fabric, in line with the needle carrying the embroidering-thread. To this end I unite the embroidering-frame with two vertically-movable frames, so that one vertically-movable frame will cause the embroidering-frame to move up and down, whereas the other vertically-movable frame will cause the embroidering-frame to move to and fro automatically.

The manner in which the two vertically-movable frames receive their motion is not a part of the present invention, as it is the subject-matter of a separate division of the reissue of the Letters Patent of which this is one division.

Principally my present invention consists in combining the fabric-frame with mechanism for giving it the two movements, one being an up-and-down movement and the other a to-and-fro movement, all as hereinafter more fully described.

In the accompanying drawings, the letter A represents a vertical metallic or wooden frame, having near its upper edge staples *a*, and held between parallel upright supporting-frames B, upon which are journaled, on pins *b*, the vertically-vibrating levers C and D. The adjacent ends of these levers are provided with the engaged segmental gears *d*, and their outer forked ends, *e*, that straddle the staples *a* of the frame A, carry pins *f*, that pass through said staples *a* in such manner that the frame A retains a free endwise movement.

The frame A is balanced by weights *g*, that are applied upon the levers C D between their fulcra and their engaged segmental geared ends. Lateral movement of the frame A is prevented by guides or guide-pins *h*.

A strong metallic plate, *i*, projects from the frame A, and has a horizontal slot, *j*, through which extends the friction-roller on arm *k* of the lever E, which lever connects by a pitman, *l*, with the vertically-movable frame F, so that whenever said frame F is moved up or down by mechanism not necessary to be fully described herein (because described in Division A of this reissue) the lever E will cause the frame A to move up and down. Another plate, *m*, that projects from the frame A, has a vertical slot, *n*, in which engages a friction roller or pin, *o*, of the elbow-lever G, which elbow-lever, by a pitman, *p*, connects with the vertically-movable frame H, to which motion is imparted by mechanism not necessary to be fully described here, because described in Division A of this reissue.

As the frame H moves up and down the lever G causes the frame A to be moved horizontally to and fro between its guides *h h*.

The needle or other mechanism for carrying the embroidery to the fabric performs its work at the point of the fabric that is brought opposite to it, and when the needle has made a stitch the action of the two frames F and H causes the frame A to be moved so as to bring the next point to be stitched opposite the needle, &c. This movement is continued until the design is perfectly worked in. This may, however, also be accomplished by a system of ropes and pulleys.

For greater clearness I will state that the frames F and H are represented as pierced by rods I, that have nuts at their lower ends and hooks at their upper ends, and that are arranged to engage their upper hooked ends over a vertically-reciprocating knife-plate frame, J, so that when said frame J engages any of the rods I said rods will lift said frames F and H respectively.

I claim—

1. The vertically-movable balanced embroidering-frame A, having horizontal slot *j* and vertical slot *n*, in combination with the levers E and G, and with the reciprocating frames F and H, and with mechanism for moving said frames F and H up and down, substantially as specified.

2. The combination of a vertical suspended fabric-frame, A, with the vertically-movable frames F and H and with intermediate connecting mechanisms, whereby the frame A is moved both vertically and horizontally, substantially as described.

MICHAEL UMSTADTER.

Witnesses:
CHAS. MYERS,
FRED. D. LOWELL.